No. 741,454. PATENTED OCT. 13, 1903.
W. H. BYAR.
COMBINED COAL HOD AND SIEVE.
APPLICATION FILED JAN. 10, 1903.
NO MODEL.
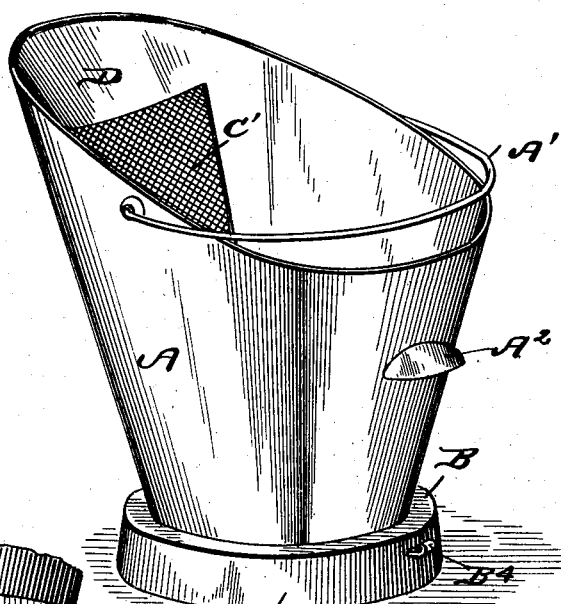
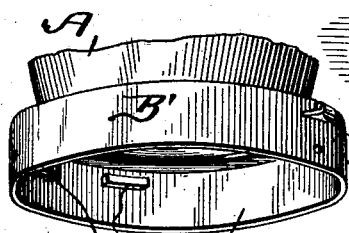
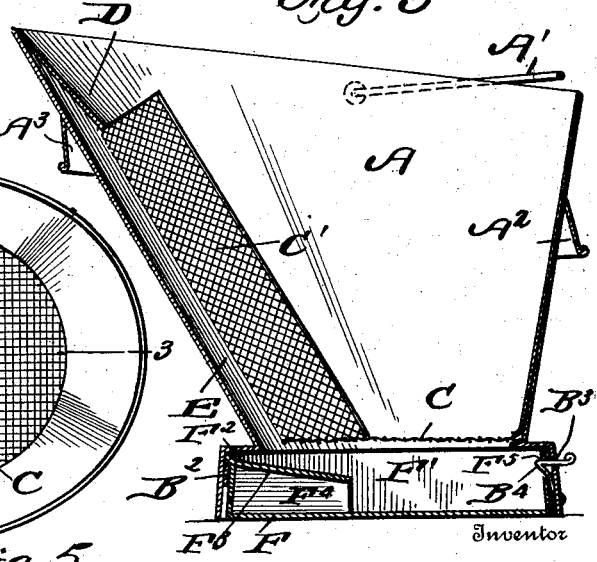
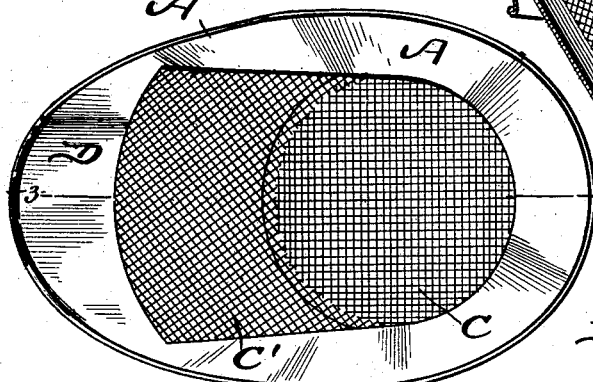
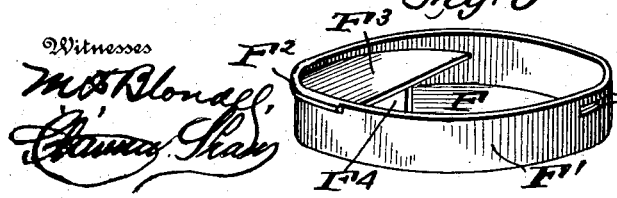
Inventor
W. H. Byar.

No. 741,454. Patented October 13, 1903.

UNITED STATES PATENT OFFICE.

WILLIAM H. BYAR, OF READING, PENNSYLVANIA.

COMBINED COAL-HOD AND SIEVE.

SPECIFICATION forming part of Letters Patent No. 741,454, dated October 13, 1903.

Application filed January 10, 1903. Serial No. 138,558. (No model.)

*To all whom it may concern:*

Be it known that I, WILLIAM HENRY BYAR, a citizen of the United States, residing at Reading, in the county of Berks and State of Pennsylvania, have invented a new and useful Combined Coal-Hod and Sieve, of which the following is a specification.

My invention is an improvement in coal-hods, and has for its object the combination, with a hod, of a sieve and a drip-pan below the sieve and forming the bottom of the hod.

The object of the hod is to separate water from wet coal, dust from dry coal, and it can also be used for sifting ashes.

In the accompanying drawings, Figure 1 is a perspective view of my device. Fig. 2 is a plan view. Fig. 3 is a section about on the line 3 3 of Fig. 2. Fig. 4 is a detail perspective view showing the inside of the bottom rim, the pan being removed. Fig. 5 is a detail view of the pan detached from the hod.

In carrying out my invention I employ a coal-hod A of the usual construction, having the loop-handle A' and the rear tilting-handle $A^2$. The bottom projects outward beyond the sides, forming a flange B, having the depending rim B'. The bottom is centrally cut out, the sides of the hod being secured to the edge of this cut-out portion, usually circular in shape, and over this cut-out portion is the screen C, forming the bottom of the hod. A rectangular screen C', curved to conform to the shape of the front of the bucket, is secured at its lower end to the front side of the screen C, which screen terminates short of the front of the hod and the flange B at the front, and at its upper end the screen C' is secured to a lip D, inclined at an angle to the front portion of the hod and forming a discharge-spout. By this construction a space E is left between the front of the hod A and the screen C' and between the front portion of the flange B and the screen C, and this passage-way is one of the main features of my invention. Within the front portion of the rim B' and adjacent the top are the lugs $B^2$, while in the rear is the slot $B^3$. A flat spring $B^4$ projects into this slot, is bent backward and downward, and is riveted to the inside of the rim, as shown in Fig. 3.

A pan having the bottom F and sides F' is adapted to fit within the rim B', and at the forward end the pan has an outwardly-turned flange $F^2$, and within the pan at the forward end is the segmental cross-plate $F^3$, braced by the upright piece $F^4$.

At the rear of the pan the side is slotted at $F^5$ to correspond to the slot $B^3$. The cross-plate is preferably arranged to slope downwardly to the rear and is so shown in the drawings.

When the pan is fitted into the rim, the flange $F^2$ rests on the lugs $B^2$ and the spring $B^4$ engages the slot $F^5$, thus holding the pan firmly in place.

When wet coal is placed in the hod, the water will drain through the screens into the pan, and when the hod is tilted the water will run into the forward end of the pan and be held there by the cover-plate $F^3$.

When dry coal containing dust is placed in the hod and coal is poured out, the dust will settle along the screen C' and pass into the passage E, and when the hod is put down the dust and dirt will slide through the passage-way into the pan, passing under the plate $F^3$ when the hod is again tilted.

A handle $A^3$ is secured to the front of the hod, and by taking hold of this handle and that $A^2$ the hod can be used for sifting ashes. By pressing down on the rear end of the spring it can be disengaged from the slot $F^5$ and the pan removed.

It will be seen from the above description that I have devised a hod very convenient for use with coal that is either wet or full of dust and dirt. It is obvious that the screen may be fine or coarse, according to the kind of coal used, a finer screen being wanted for a small nut-coal than for a large-sized coal.

Having thus fully described my invention, what I claim as new, and desire to secure by Letters Patent, is—

1. A coal-hod having an exterior flange around the bottom bent down to form a depending rim, lugs on the inner front side of said rim, a spring secured on the inner opposite side of the rim, a pan having a flange on its front portion adapted to engage the lugs, a slot in the rear side of the pan adapted to be engaged by the spring, and a screen above the pan.

2. A coal-hod having a front lip portion, an inclined screen secured to the lower edge of the lip portion, a screen-bottom secured at its front edge to the lower edge of the inclined screen, the said edges being spaced from the front side of the hod, and a pan detachably secured below the screen-bottom, said pan extending in advance of the front of the screen, and an inclined plate in said pan said plate being arranged immediately beneath the front edge of the bottom screen.

WILLIAM H. BYAR.

Witnesses:
WILLIAM F. GODSHALL,
WM. H. HOUCK.